United States Patent [19]

Even-Or

[11] Patent Number: 5,032,839

[45] Date of Patent: Jul. 16, 1991

[54] SELF-EQUALIZING COHERENT OPTICAL RF MEMORY

[75] Inventor: Baruch Even-Or, Chalfont, Pa.

[73] Assignee: American Electronic Laboratories, Inc., Lansdale, Pa.

[21] Appl. No.: 506,401

[22] Filed: Apr. 9, 1990

[51] Int. Cl.[5] .................. G01S 7/38; G11C 13/04; H03H 11/12
[52] U.S. Cl. ........................... 342/15; 307/521; 365/63; 365/76
[58] Field of Search .................. 342/15, 172, 51; 365/64, 73, 76; 307/521

[56] References Cited

U.S. PATENT DOCUMENTS

| | | | |
|---|---|---|---|
| 3,537,077 | 10/1970 | Gerig | 365/76 |
| 3,742,259 | 6/1973 | Donald et al. | 307/521 |
| 4,017,856 | 4/1977 | Wiegand | 342/15 |
| 4,322,730 | 3/1982 | Chrzenowski | 342/15 |
| 4,328,496 | 5/1982 | White | 342/15 |
| 4,398,196 | 8/1983 | Wiegand | 342/13 |
| 4,473,270 | 9/1984 | Shaw | 365/64 X |
| 4,713,662 | 12/1987 | Wiegand | 342/13 |
| 4,743,905 | 5/1988 | Wiegand | 342/15 |
| 4,903,029 | 2/1990 | Newberg et al. | 342/172 |

FOREIGN PATENT DOCUMENTS 1467000  3/1977  United Kingdom ............... 342/15

OTHER PUBLICATIONS

"EW System Applies Deceptive Countermeasures", Microwaves, vol. 18, No. 1, Jan. 1979, p. 91.

*Primary Examiner*—Gilberto Barron, Jr.
*Attorney, Agent, or Firm*—Seidel, Gonda, Lavorgna & Monaco

[57] ABSTRACT

A coherent optical RF memory has an input circuit for receiving RF input signals having wideband frequency content. An electronically tuned frequency selector selects from the RF input at least one desired RF signal having a desired frequency content for storing in memory. A first transducer responsive to the frequency selector converts the at least one desired RF signal into an optical signal representative of the RF signal. The optical signal is stored in an optical storage device. A second transducer responsive to the optical storage device converts the stored optical signal back to an RF signal, forming a recirculating loop. The desired signal is automatically self-equalized as it recirculates in the loop in order to avoid oscillation while maintaining signal coherency. The desired signal may be used for jamming or deception in electronic warfare (EW) or electronic intelligence (ELINT) systems.

6 Claims, 2 Drawing Sheets

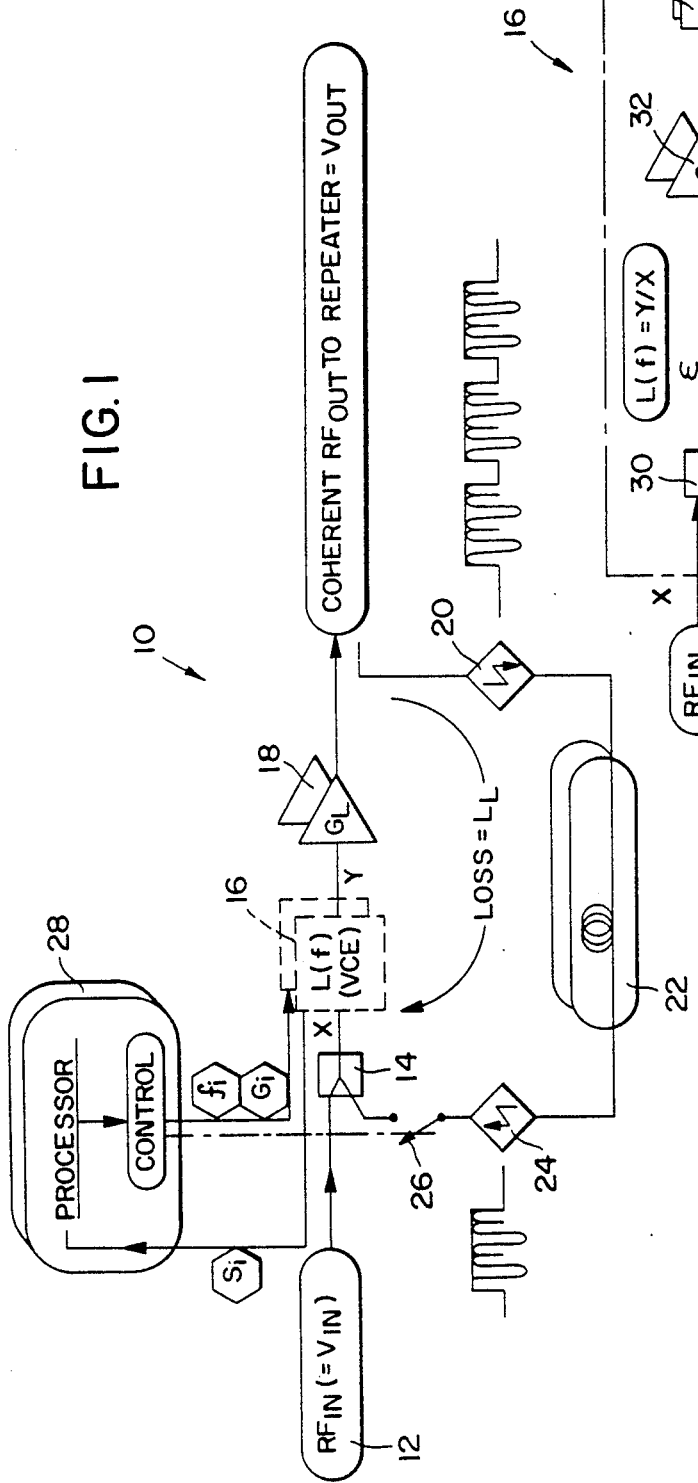
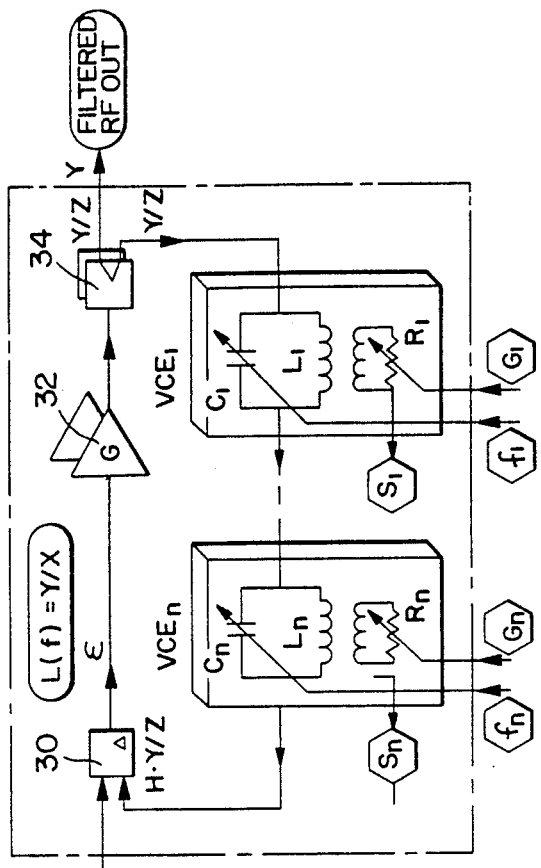
FIG.1
FIG.2

SELF-EQUALIZING COHERENT OPTICAL RF MEMORY

FIELD OF THE INVENTION

The present invention relates to an RF memory circuit and, in particular, to a self-equalizing coherent optical RF memory circuit for coherently capturing, storing and retransmitting complex RF signals over a wide frequency spectrum using analog methods.

BACKGROUND OF THE INVENTION

RF memory circuits, or loops, are currently in use for non-coherent signal interception and retransmission. RF memory circuits are used to store desired RF signals, such as signals from hostile radars or communications, for various electronic warfare (EW) and electronic intelligence (ELINT) applications. Such applications include coherent radar jamming, spoofing and deception, as well as coherent communication jamming and deception. Generally, these applications are achieved through processing circuits which alter the signal received from a hostile source and retransmit the altered signal so as to convey false information.

Typically, the hostile signals are deliberately made difficult to detect. They may be transmitted at very low power, or in bursts of very short duration. Very often, such signals contain embedded codes, which a hostile radar, for example, checks for in the return in order to distinguish a true return from a false signal. In addition, because radar and communications signals are typically of very high frequency, the duration of such signals is very short. The RF signals to be captured, processed and retransmitted thus may exist only for fleeting instants and may cease to exist before the EW and ELINT circuits are capable of processing them. It is therefore necessary to have a memory circuit capable of storing the RF signals so that they can be available to the EW and ELINT processing circuits.

Digital RF memory circuits (DRFMs) have been used in the past for coherent RF signal capture, storage and retransmission. Coherent capture is vital if a false signal is to have the same spectral characteristics as the incoming signal. If the signals are captured non-coherently, spoofing or decoding may be ineffective or impossible. DRFM circuits have some drawbacks, however. The DRFM's instantaneous bandwidth is presently limited typically to less than one GHz, which is inadequate in most cases. In addition, the DRFM's digitalization process inherently contaminates the incoming RF signals with spurious noise, which distorts the RF signal. DRFMs also operate poorly in a simultaneous signal environment, which is usually the situation in most realistic applications.

Analog RF memory loops have also been used, but have been limited to non-coherent signal intercept and retransmission. Although analog RF memory loops avoid the drawbacks of DRFMs, analog memory loops have heretofore been impractical for coherent intercept and retransmission.

The present invention makes it possible to employ analog RF memory loops with coherent signal processing, eliminating the need for DRFMs and their drawbacks. Thus, the present invention makes it possible to achieve the advantages of analog RF memory loops in coherent intercept and retransmission applications.

SUMMARY OF THE INVENTION

In its broadest form, the present invention is a coherent optical RF memory comprising input means for receiving RF input signals having frequency content over a wide frequency spectrum, frequency selector means for selecting from the RF input at least one desired RF signal having a desired frequency content for storing in memory, first transducer means responsive to the frequency selector means for converting the at least one desired RF signal into an optical signal representative thereof, optical storage means responsive to the transducer means for storing the optical signal, and second transducer means responsive to the optical storage means for converting the stored optical signal back to an RF signal. The invention has particular utility in EW and ELINT systems, but it is by no means limited to such applications.

In a presently-preferred aspect of the invention, the invention comprises a closed-loop optical RF memory comprising input means for receiving RF input signals having frequency content over a wide frequency spectrum, frequency selector means in series with the input means for selecting from the RF input at least one desired RF signal having a desired frequency content for storing in memory, and a feedback path connecting the output of the frequency selector means to the input means. The feedback path comprises RF-to-optical transducer means connected to the output of the frequency selector means for converting the at least one desired RF signal to an optical signal representative thereof, an optical delay line for receiving and storing said optical signal, and optical-to-RF transducer means connected to said input means for converting said optical signal back to an RF signal.

In a presently-preferred embodiment of the invention, the frequency selector means is a closed-loop electronically-variable self-equalizing filter circuit having a signal path with an input end and an output end and a feedback path having an input end connected to the output end of the signal path and an output end connected to the input end of the signal path. The signal path comprises a difference circuit for receiving an input signal to be filtered and the output feedback signal of the feedback path and generating a difference signal representative of the difference between the input signal and the feedback signal, amplifier means for receiving and amplifying the difference signal, and output means for providing a filtered output signal and a feedback input signal to the feedback path. The feedback path comprises electronically-variable filter means for generating a feedback signal composed substantially of only the frequency components to be removed from the input signal.

In different terms, the invention comprises a coherent RF memory (CORFM) which intercepts an RF signal over a broad intercept spectrum, captures selected frequency bands of the RF signal, and stores the selected frequency bands in an RF/optical delay line and recirculating loop, all the while maintaining signal coherency so that the spectral characteristics of the captured RF signal remain substantially unchanged. The stored signal is available for processing and retransmission by an EW or ELINT circuit, for example. The CORFM comprises an RF/optical delay line configured as a feedback loop employing self-equalizing circuitry (SEC). The delay line is used for RF signal storage and refreshing, and includes RF-to-optical transducer means which convert the RF signals into optical signals which are applied to the input of a fiber optic delay line. Optical-to-RF transducer means convert the optical signals back into RF signals which can be used directly by EW or ELINT processing circuitry. Preferably, the delay line has an attenuation of less than 1.0 dB per 4.5 microseconds, making it capable of storing extremely long RF pulses.

The low attenuation of the delay line is achieved by maintaining the loop gain high enough to prevent rapid signal decay but low enough to prevent the loop from going into oscillation. The loop gain is preferably between 0.95 and 1.0. The loop gain is adjusted for each circulation of the stored signal by a self-equalizing circuit (SEC). The SEC includes at least one varactor-controlled equalizer (VCE). The varactors in the VCE are, in turn, controlled by a processor/control circuit, such as a microprocessor. The VCE comprises a plurality of tunable resonators in cascade, disposed in the feedback loop of an amplifier. Each tunable resonator is used as a bandstop filter, or notch filter, and is swept across a predetermined frequency range by varying the varactors under control of the microprocessor, to capture desired RF signals in that range. As soon as a desired signal is captured, sweeping is stopped and the center frequency of the resonator stage for that frequency is set at the signal frequency by the microprocessor. The captured signal is then circulated through the optical delay line and the VCE gain is continually adjusted, also by the microprocessor, so that the total loop gain is maintained slightly below unity while the captured signal circulates through the loop. Since there may be several resonators in the VCE, additional signals can be simultaneously captured. The number of simultaneous signals which can be captured and recirculated is limited only by the number of resonators in the loop.

The CORFM of the invention operates in a linear, or analog, mode instead of relying on previously digitized signals, thus providing spurious-free signal capture and retransmission. The instantaneous bandwidth of the CORFM of the invention exceeds 4 GHz, making it usable at frequencies beyond those achievable with conventional DRFM circuits.

The exact manner in which the invention achieves these and other objects and advantages will become more clearly apparent when reference is made to the following detailed description of the preferred embodiments of the invention.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is a schematic diagram illustrating a presently-preferred embodiment of an RF optical memory circuit according to the invention.

FIG. 2 is a schematic diagram of a presently-preferred embodiment of self-equalizing circuitry suitable for use in an RF optical memory circuit according to the invention.

DESCRIPTION OF THE INVENTION

Figure 3:
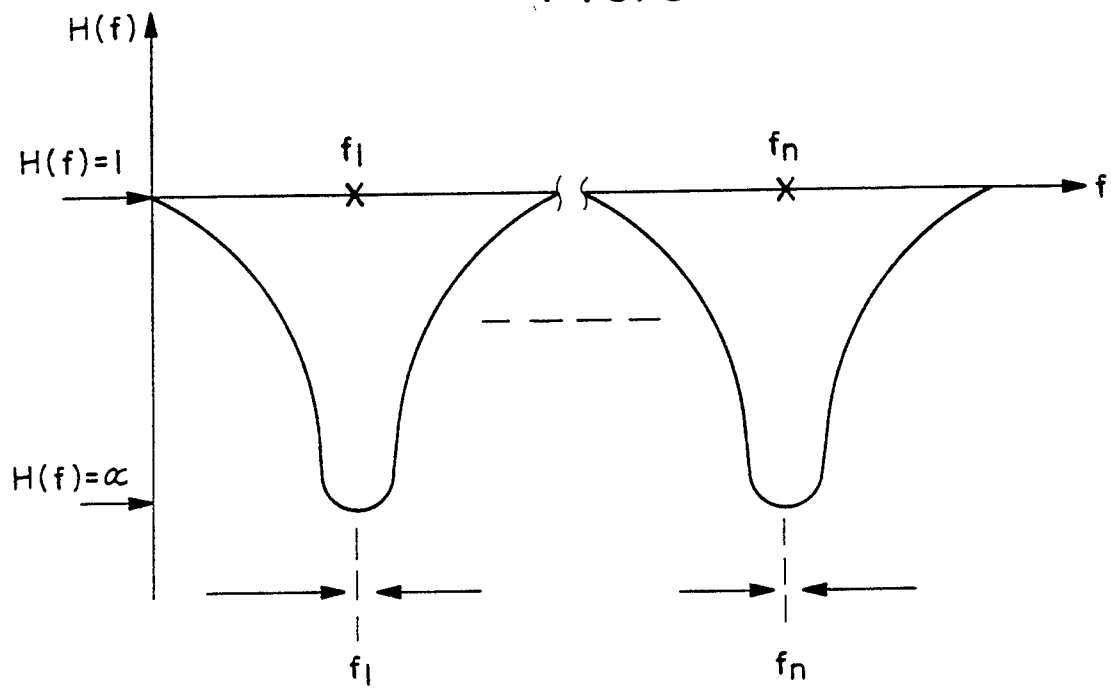
FIG. 3 is a frequency plot illustrating the frequency response of individual resonators in the varactor-controlled equalizer.

Referring now to the drawings, wherein like numerals indicate like elements, there is shown in accordance with the invention a coherent optical RF memory (CORFM) circuit generally indicated by reference numeral 10. The CORFM memory circuit captures desired complex RF signals, for example those signals generated by hostile radars, stores the signals in an optical feedback loop and retransmits them to processing circuits, such as a repeater, which may be used, for example, to jam or otherwise alter the signal and then retransmit the signal to the hostile radars as a "false target." The desired RF signals are captured from RF signals having frequency content over a wide frequency spectrum, designated $RF_{nd}$ received at the input of CORFM 10.

Referring specifically to FIG. 1, CORFM 10 receives wide-spectrum RF input signals from an RF source 12. RF source 12 may, for example, be an antenna or any other signal source. Typically, RF signals to be captured have frequency content over a wide spectrum, encompassing, but not limited to, telecommunications, radar, and the like. The particular frequency spectrum over which the invention may operate should be understood as illustrative only and not as limiting in any way the scope of the invention.

The wide-spectrum RF input signal is applied to one input of an RF combiner 14. The other input to RF combiner 14 is connected to an optical-to-RF transducer, as will be described in greater detail below. The output of combiner 14, designated "X," forms the RF input to a self-equalizing circuit, or SEC, 16. Self-equalizing circuit 16 captures preselected signals within the wide-spectrum RF input from RF source 12 for storage. The output of SEC 16, designated "Y," is applied to an amplifier 18 having a very high ($>>1$) open loop gain $G_L$. The output of amplifier 18 is a coherent RF output signal, $RF_{out}$, which is sent to processing circuitry, such as a repeater, for suitable processing for desired EW and ELINT applications.

A portion of the output of amplifier 18 is also applied to an RF-to-optical transducer 20, which converts the coherent RF output signal from amplifier 18 to an optical signal. The optical output of transducer 20 is applied to an optical storage means in the form of a fiber optic delay line 22. Delay line 22 may, for example, be a long length of optical fiber. Preferably, the attenuation of fiber optic delay line 22 is less than 1 dB per 4.5 microseconds (i.e., 1 dB per kilometer). By choosing a fiber optic delay line 22 with a low attenuation, the delay line 22 can store relatively long RF pulses. The output of fiber optic delay line 22 is applied to an optical-to-RF transducer 24, which converts the optical signal stored in fiber optic delay line 22 back to an RF signal. The converted RF signal output of transducer 24 is applied to the second input of combiner 14 via a normally-open switch 26 which may be selectably opened and closed under control of a processor circuit 28 as will be described in greater detail below.

Signal capture and control of loop gain are accomplished by the SEC, which is shown in greater detail in FIG. 2. SEC 16 comprises a closed loop feedback system in which the feedback path is composed of a plurality of varactor-controlled equalizer stages in cascade from the output of SEC 16 to its input. Any desired number of VCE stages may be used. In the embodiment illustrated in FIG. 2, n individual stages are contemplated. The precise number of stages n may be as large or as small as desired, depending upon the number of individual frequencies to be captured and stored by CORFM 10. Each individual VCE stage may be tuned, or "swept," and may have its gain varied, under control of processor circuit 28. The manner in which VCE 16 operates will now be described.

The input signal X to VCE 16 is, as previously described, the output of combiner 14. Thus, RF input signal X comprises a wide-spectrum RF signal. RF input signal X is applied to one input of a difference circuit 30. The other input to difference circuit 30 is the output from the feedback path of VCE stages in cascade. The output of difference circuit 30 is a difference signal $\epsilon$, which is the difference between the two inputs. Difference signal $\epsilon$ may be represented as:

$$\epsilon = X - (H \cdot Y/2)$$

where $H \cdot Y/2$ is the output from the VCE stages. The difference signal $\epsilon$ is amplified in amplifier 32. Amplifier 32 has a very high ($>>1$) open loop gain G. As those skilled in the art will appreciate, the amplified difference signal could also be obtained by using a high-gain differential amplifier instead of difference circuit 30 and a separate amplifier 32. The amplified difference signal from amplifier 32 is applied to RF splitter 34 which, preferably, divides the amplified difference signal into two equal halves Y/2. If a high-gain differential amplifier is used, splitter 34 may be omitted. One of the split signals from splitter 34, designated "Y," represents the filtered RF output which is applied to amplifier 18 in CORFM 10 (see FIG. 1).

The other half of the split signal, designated "Y/2," forms the input to the cascade of VCE stages in the feedback loop. As illustrated in FIG. 2, the cascade comprises n individual VCE stages $VCE_1, \ldots, VCE_n$. Each individual VCE stage $VCE_i$ comprises a parallel tunable resonator which acts as a tunable bandstop, or "notch," single stage filter. The center frequency of an individual stage $VCE_i$ is preselected, in known manner, for a notch filter. The center frequency of each VCE stage $VCE_i$ is chosen to reject a frequency desired to be captured and stored by CORFM 10, as illustrated in FIG. 3. The reason for this will become apparent below.

Each VCE stage $VCE_i$ may be tuned, or "swept," across a given frequency range. Conveniently, tuning may be achieved by including an LC tank circuit in which the capacitive element is a varactor. As those skilled in the art will readily understand, the capacitance of a varactor may be varied electronically.

Control signals for electronically varying the varactors in individual VCE stages are provided by processor circuit 28. Preferably, processor 28 comprises a microprocessor and an appropriate analog/digital input/output put interface. The microprocessor may be preprogrammed to generate sweep voltages to the individual VCE stages so that each individual VCE stage may be automatically swept across its frequency range. The sweep signals from processor 28 are designated generally as $f_i$, where $i = 1, \ldots, n$.

When the input signal Y/2 to the VCE stages contains a given frequency, for example $f_1$, $VCE_1$ will resonate. This condition may be detected by processor 28 by means of sensing signals $S_i$ from the VCE stages of SEC 16, designated in FIG. 2 as $S_1, \ldots, S_n$. Processor 28 may be programmed to continually monitor the sensor signals $S_i$ from SEC 16. When a sensor signal indicates that its associated VCE stage is in resonance, indicating that a particular frequency has been detected, processor 28 terminates sweeping and locks the associated VCE stage at the detected frequency by setting the VCE center frequency at the frequency of the detected signal. When a desired signal is detected, processor 28 also closes normally-open switch 26 (see FIG. 1), and the detected frequency will circulate, and be stored, in CORFM 10. Switch 26 is left normally-open to minimize unwanted noise in the loop.

Figure 4:
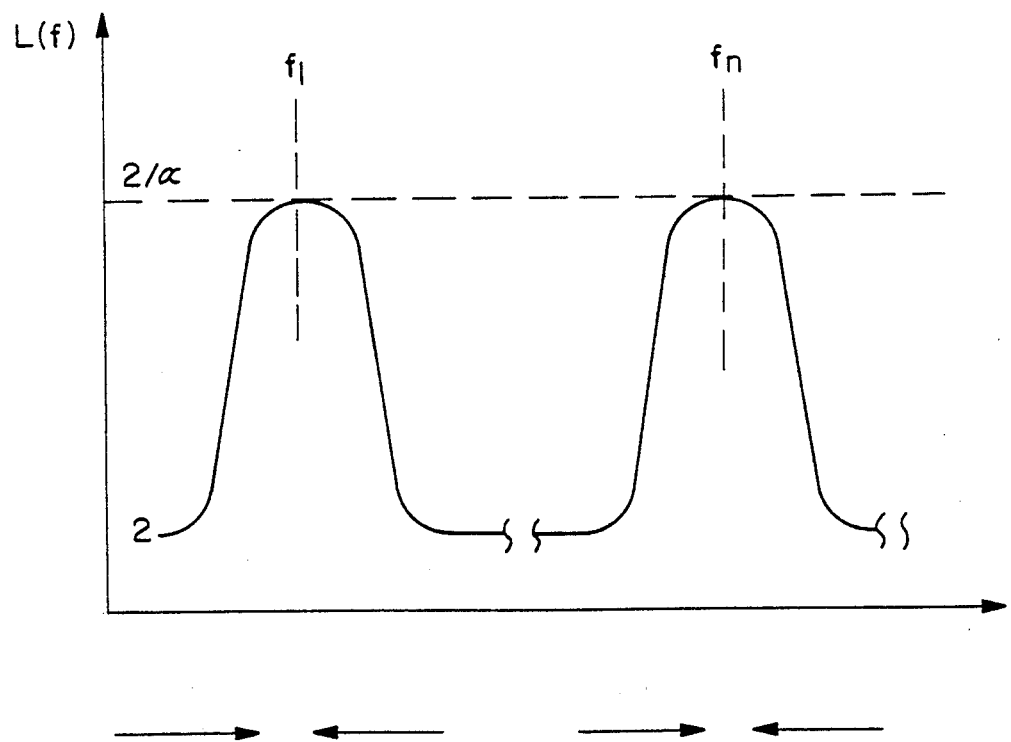
FIG. 4 is a frequency plot illustrating the overall frequency response of the varactor controlled equalizer.

It will be seen that the output of the cascade of VCE stages will be a filtered RF signal which contains only those frequencies not desired to be captured and stored. Thus, when the output of the cascade of VCE stages is subtracted from the RF input signal X in difference circuit 30, the difference signal $\epsilon$ will consist of only those frequencies desired to be captured and stored. Hence, after one circulation of the RF input signals in SEC 16, the filtered RF output Y will consist of only those frequencies desired to captured and stored, as illustrated in FIG. 4.

Sensor signals $S_1, \ldots, S_n$ may also be processed by processor 28 to determine the output amplitude of each individual VCE stage. By sensing amplitude information, processor 28 can generate gain control signals $G_i$, which allow individual VCE stages $VCE_i$ to be adjusted for gain so that the total loop gain is maintained slightly below unity, as required for proper closed loop operation. This is accomplished by electronically varying the resistance of the variable resistors $R_i$ in individual VCE stages $VCE_i$. As can be seen from FIG. 2, varying $R_i$ will cause the "Q" of the associated VCE stage $VCE_i$ to vary. By varying $Q_i$ for an individual VCE stage $VCE_i$, the rejection of stage $VCE_i$ can be varied, thus varying the amplitude of the selected frequency $f_i$. Thus, by varying $R_i$, overall loop gain can be adjusted. Preferably, $R_i$ is varied to maintain overall loop gain between 0.95 and 1.0.

The variable resistors $R_i$ may be implemented in any desired fashion, such as, for example, a pair of opposed diodes. By varying the bias across the opposed diodes, their resistance can be varied across a preselected linear range. Of course, any other technique for realizing the variable resistors $R_i$ may be employed without departing from the scope of the invention.

It will also be appreciated that, while one desired signal is recirculating in the loop of SEC 16, another signal can be captured by another VCE stage. Moreover, the VCE stages $VCE_i$ all operate simultaneously, so that any number of desired signals can be simultaneously captured for storage. The number of simultaneous signals is limited only by the number of VCE stages. Also, the intercept spectrum may be made as wide as desired by adding additional SECs in parallel with SEC 16.

Operation of SEC 16 may also be described in mathematical terms, with reference to FIGS. 3 and 4. Each individual VCE has a bandstop, or notch, frequency response centered about a desired frequency $f_i$. Thus, each VCE has a transfer function $H(f_i)$, of which two are illustrated in FIG. 3 for frequencies $f_1$ and $f_n$. Since the VCE stages are in cascade, the overall transfer function H(f) for the VCE feedback path is the sum of the individual transfer functions $H(f_i)$ of the individual VCE stages. The individual VCE stages are designed so that $H(f) = 1$ for those frequencies not rejected and $H(f) = \alpha$ where $\alpha >> 1$ at the notch frequency $f_i$. The exact value of $\alpha$ is a function of the design of the VCE stages and of the resistance value of $R_i$ as set by the gain control signals $G_i$ from processor 28. Hence, difference signal $\epsilon$ can be written as $$\epsilon = X - H \cdot Y/2 \tag{1}$$

From examination of FIG. 2, it can be seen that the amplified error signal Y may be written as $$Y = \epsilon \cdot G/2 \tag{2}$$

Substituting for $\epsilon$ in equation (2) yields $$Y = [X - H \cdot Y/2] G/2 \tag{3}$$

This equation may be rewritten as $$Y[1 + H \cdot G/4] = X \cdot G/2 \tag{4}$$

For the sake of convenience, G/2 may be defined as $$G/2 = G^* \tag{5}$$

Rewriting this equation yields the overall transfer function L(f) of the SEC 16 in terms of the transfer function of the VCEs:

$$\frac{Y}{X} = \frac{G^*}{1 + (H/2 \cdot G^*)} = L(f) \tag{6}$$

L(f) is shown in FIG. 4.

Referring now to both FIGS. 3 and 4, it can be seen that, for frequencies not rejected by the VCEs, H(f)=1. When H(f)=1, equation (6) may be rewritten as $$L(f) = \frac{G^*}{1 + G^*/2} = \frac{2G^*}{2 + G^*} \tag{7}$$

Since $G^*$ very large, i.e., $G^* \gg 1$, L(f) is approximately $$L(f) \approx \frac{2G^*}{G^*} \text{ or } L(F) \approx 2 \tag{8}$$

At the center frequency of the VCEs, H(f)=$\alpha$. When H(f)=$\alpha$, L(f) can be written as $$L(f) = \frac{G^*}{1 + (\alpha \cdot G^*/2)} = \frac{2G^*}{2 + \alpha G^*} \tag{9}$$

Since $G^*$ is very large, i.e., $G^* \gg 1$, this equation can be written as $$L(f) = \frac{2G^*}{\alpha G^*}, \text{ or } L(f) \approx \frac{2}{\alpha} \tag{10}$$

Since $\alpha$ is $\ll 1$, L(f) will be quite high at the center frequencies of the VCEs. Thus, it can be seen that the overall transfer function L(f) of SEC 16 is, in effect, that of a comb filter, which passes only the frequencies desired to be captured and stored.

Moreover, since $\alpha$ can be varied by varying $R_i$, L(f) can also be varied by varying $R_i$. Thus, by varying $R_i$, the amplitude of amplified error signal $Y = L(f) \cdot X$ can be controlled, thus controlling overall loop gain.

It is believed that the present invention offers excellent loop signal to noise ratio. Assuming a loop gain of 0.95 and a band pass filter bandwidth of $\Delta f = 10$ MHz, a loop noise figure of F=20 dB and an input signal level of 0 dBm, the corresponding signal to noise ratio after 100 recirculations of the signal around the loop is expected to be 32 dB.

The present invention may be embodied in other specific forms without departing from the spirit or essential attributes thereof and, accordingly, reference should be made to the appended claims, rather than to the foregoing specification, as indicating the scope of the invention.

I claim:

1. A closed loop electronically-variable self-equalizing filter circuit having a signal path with an input end and an output end and a feedback path having an input end connected to the output end of the signal path and an output end connected to the input end of the signal path, the signal path comprising a difference circuit for receiving an input signal to be filtered and the output feedback signal of the feedback path and generating a difference signal representative of the difference between the input signal and feedback signal, amplifier means for receiving and amplifying the difference signal, and output means for providing a filtered output signal and a feedback input signal to the feedback path, the feedback path comprising a plurality of independent electronically-variable filter means in cascade for generating a feedback signal containing a plurality of desired frequency components to be selected from the input signal.

2. The circuit of claim 1, wherein each electrically-variable filter means resonant circuit means for varying the amplitude of the feedback signal.

3. A coherent optical RF memory comprising
  (a) input means for receiving RF input signals having frequency content over a wide frequency spectrum,
  (b) frequency selector means for selecting from the RF input at least one desired RF signal having a desired frequency content for storing in memory, said frequency selector means comprising a closed loop electrically-variable self-equalizing filter circuit having a signal path with an input end and an output end and a feedback path having an inlet end connected to the output end of the signal path and an output end connected to the input end of the signal path, the input end of the signal path being connected to the input means and the output feedback signal of the feedback path, the signal path comprising amplifier means and output means for providing a filtered output signal and a feedback input signal to the feedback path, the feedback path comprising a plurality of independent electronically-variable filter means in cascade for generating a feedback signal containing a plurality of desired frequency components to be selected from the RF input signals,
  (c) first transducer means responsive to the frequency selector means for converting the at least one desired RF signal into an optical signal representative thereof,
  (d) optical storage means responsive to the transducer means for storing the optical signal, and
  (e) second transducer means responsive to the optical storage means for converting the stored optical signal back to an RF signal.

4. A memory as in claim 3, wherein the electronically-variable filter means comprises resonant circuit means for varying the amplitude of the feedback signal.

5. A closed-loop optical RF memory comprising
(a) input means for receiving RF input signals having frequency content over a wide frequency spectrum,
(b) frequency selector means in series with the input means for selecting from the RF input at least one desired RF signal having a desired frequency content for storing in memory, said frequency selector means comprising a closed loop electronically-variable self-equalizing filter circuit having a signal path with an input end and an output end and a feedback path having an input end connected to the output end of the signal path and an output end connected to the input end of the signal path, the signal path being connected to the input means and comprising a difference circuit for receiving an input signal to be filtered and the output feedback signal of the feedback path and generating a difference signal representative of the difference between the input signal and feedback signal, amplifier means for receiving an amplifying the difference signal, and output means for providing a filtered output signal and a feedback input signal to the feedback path, the feedback path comprising a plurality of independent electronically-variable filter means in cascade for generating a feedback signal containing a plurality of desired frequency components to be selected from the input RF signals, and
(c) a feedback path connecting the output of the frequency selector means to the input means, the feedback path comprising
 (i) RF-to-optical transducer means connected to the output of the frequency selector means for converting the at least one desired RF signal to an optical signal representative thereof,
 (ii) an optical delay line for receiving said optical signal, and
 (iii) an optical-to-RF transducer means connected to said input means for converting said optical signal back to an RF signal.

6. A memory as in claim 5 wherein the electronically-variable filter means comprises resonant circuit means for varying the amplitude of the feedback signal.

* * * * *